Jan. 29, 1929.

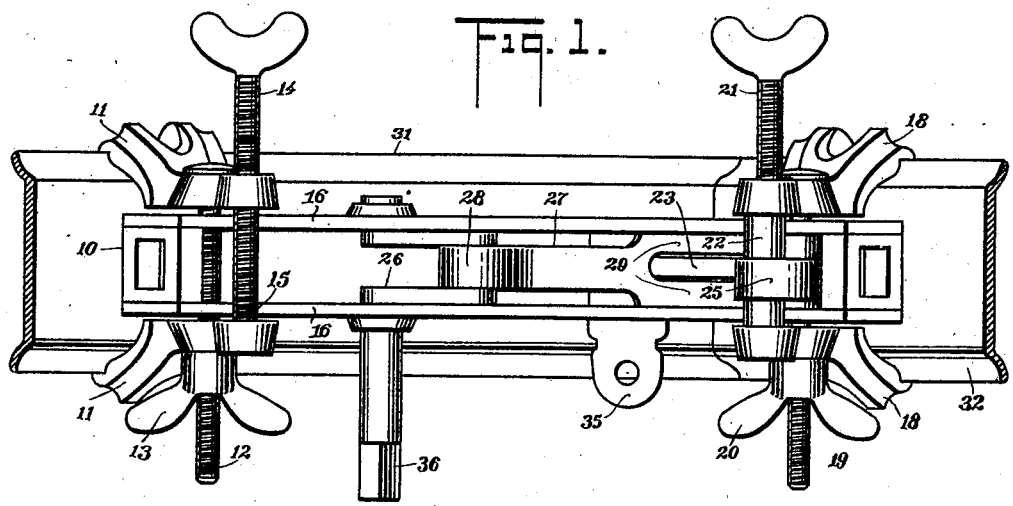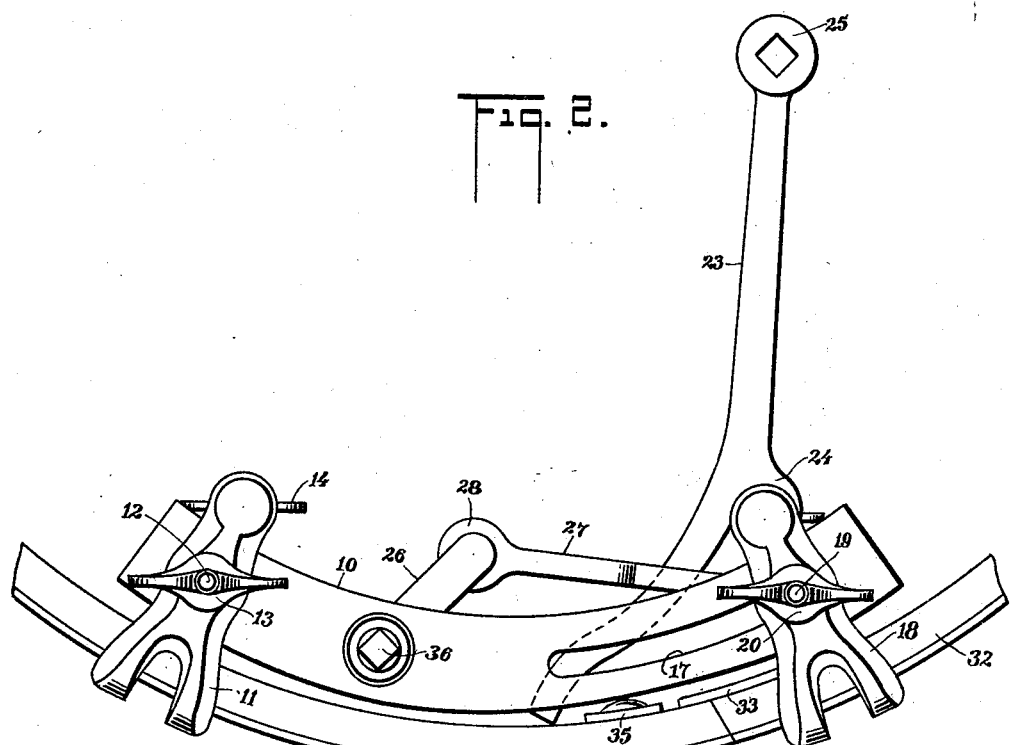

S. H. SAVAGE 1,700,719

TIRE RIM CONTRACTING DEVICE

Filed Feb. 16, 1928

WITNESSES
Jos. R. Lamia
Chris Feinle

INVENTOR
Samuel H. Savage
BY
ATTORNEY

Patented Jan. 29, 1929.

1,700,719

UNITED STATES PATENT OFFICE.

SAMUEL HADEN SAVAGE, OF NORTH BERGEN, NEW JERSEY.

TIRE-RIM-CONTRACTING DEVICE.

Application filed February 16, 1928. Serial No. 254,806.

This invention relates to the class of devices adapted to be used for contracting a tire rim of the split type, to enable a person to readily carry out tire removing and replacing operations.

One of the objects of the invention is to provide a more sturdy and effectual device of the indicated character.

Another object of the invention is to provide a device of the indicated character, which will facilitate the flexing of one of the abutting ends of the rim to a position to permit it to be drawn to an overlapped relation to the other end in the contracting operation.

Another object of the invention is to provide a device of the indicated character which will hold the rim in the contracted condition while the tire is being removed and replaced, and until released to return to its normal condition.

The nature of the invention and its distinguishing features and advantages will appear when the following specification is read in connection with the accompanying drawing, in which—

Figure 1 is a view looking down on the device in position and in engagement with the abutting ends of a tire rim, ready to be actuated to flex one of the ends to a position to permit it to be drawn to an overlapped relation with respect to the other end.

Fig. 2 is a side elevation of the device as shown in Fig. 1.

Figure 3:
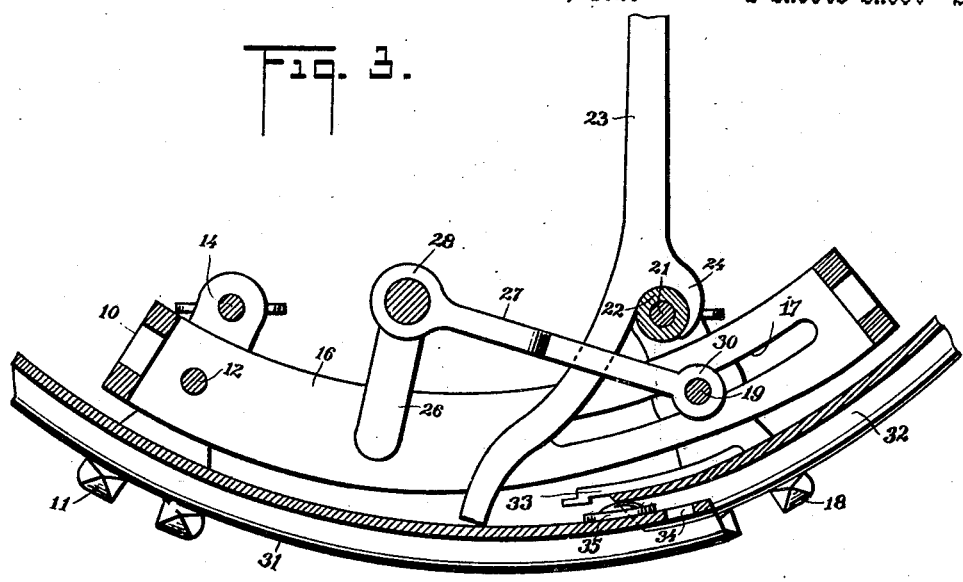
Fig. 3 is a longitudinal sectional view through the device after actuation, and with one of the rim ends flexed from its normal position ready to be drawn to a further overlapped relation with respect to the other end of the rim.

Referring now more particularly to the drawings, it will be apparent that the device includes a block 10 of arcuate construction. A clamp including a pair of gripping members 11 is employed in connection with one end of the block 10, and said members 11 are relatively adjustable. One of the gripping members 11 has secured thereto a screw 12 which extends through the block 11, and through an unthreaded hole in the other gripping member 11. The gripping members 11 will be disposed respectively at opposite sides of the block 10 and will be held in their gripping positions by a thumb nut 13 adjustable on the screw 12, and a thumb screw 14 adapted for threading engagement with the gripping member 11 having the screw 12, and the end of the screw 14 being engageable with the other gripping member 11 as at 15. The parts 11, 12, 13 and 15 constitute a clamp with which the block 10 is connected for pivotal movement on the screw 12. Screw 12 with its nut 13 and screw 14 constitute counter-acting means which holds the gripping members 11 engaged with the related rim end without any binding action on the block 10. The block 10 includes side members 16 each of which has an arcuate slot 17. The slots 17 occur at one end of the block 10, are directly opposite each other, and may be of any preferred length. A second clamp including a pair of gripping members 18 is employed, and said members 18 are similar in construction to the gripping members 11. One of the gripping members 18 has secured thereto a screw 19 which extends through the slots 17 and through an unthreaded hole in the other gripping member 18. The gripping members 18 are adjustable with respect to each other, and will be adjustable with respect to the block 10, lengthwise thereof. The gripping members 18 will be maintained in gripping engagement with the rim end by the use of a wing nut 20 adapted for threading engagement with the screw 19. Use is also made of a thumb screw 21 which is adapted for threading engagement with one of the gripping members 18, and is engageable with the other gripping member 18 so as to hold the upper ends of the gripping members 18 apart, and the lower ends or jaws of the members in gripping engagement with the rim end. A sleeve or tubular member 22 is arranged on the screw 19 to protect the threads thereof. The parts 18, 19, 20 and 21 constitute a clamp connected with the block 10 for sliding movement. The screw 19 with its nut 20, and screw 21 constitute counter-acting means which hold the gripping members 18 engaged with the related rim end without any binding action on the block 10.

In order to actuate the device for contracting the rim there is provided a bar 23 having a hook 24 intermediate its ends, and a socket 25 at one end. There is also provided a crank 26 carried by the side members 16 of the block 10 for rotatory movement, and a link 27, one end of which is pivotally connected as at 28 with the crank and the spaced members 29 are each pivotally connected as at 30 with the screw 19.

Figure 4:
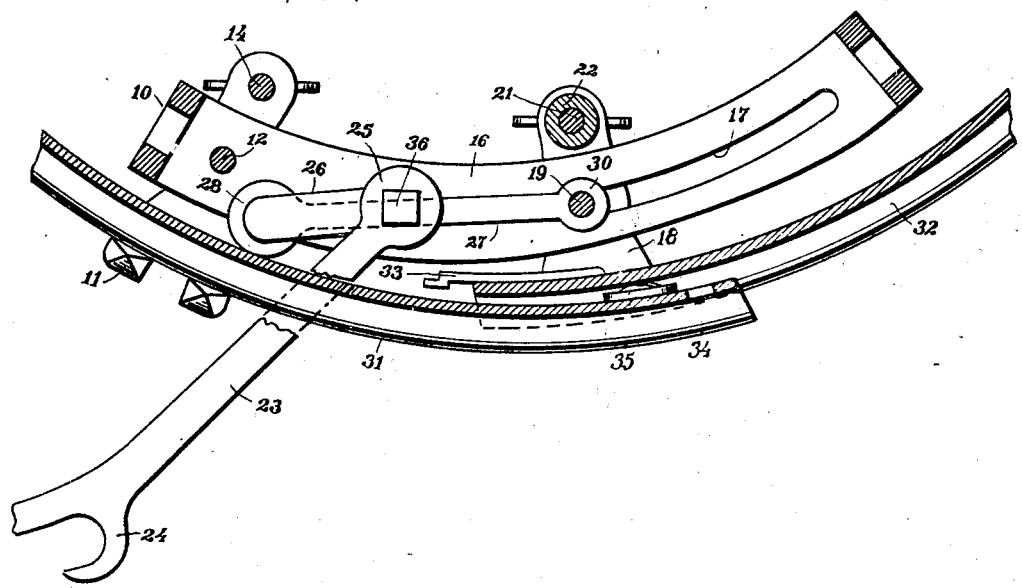
Fig. 4 is a view similar to Fig. 3 but showing the rim ends in the overlapped relation and locked or held in such relation by the device.

In the use of the device, the gripping members 11 are brought into gripping engagement with one of the abutting ends of a tire rim, such rim end being designated 31. The gripping members 11 are set in any preferred position according to the degree of overlap of the rim ends desired. The other gripping members 18 are then brought into gripping engagement with the other rim end designated 32. The rim ends are usually held by retaining members, one of which designated 33 is secured to the rim end 32 and is adapted to engage in an opening 34 in the rim end 31, a second retaining member 35 is pivotally connected with the other rim end 31 and is engageable with the retaining member 33 to hold it in locking position. The member 35 is movable to a position as shown in the drawing to allow the rim end 32 to be flexed or sprung inwardly by disengaging the member 33. This is accomplished by the use of the bar 23, the hook 24 of which is brought into engagement with the sleeve 22, while the lower end rests on the rim end 31 to serve as a fulcrum. When force is applied to the upper end of the bar 23, an upward pull will be exerted on the sleeve 22, and as a consequence the rim end 32 will be flexed to a position to permit it to be drawn further to an overlapped relation with respect to the rim end 31. In Fig. 3 the rim end 32 is shown flexed inwardly as the result of the initial operation. The bar 23 is then removed and the socket 25 is placed on the squared end 36 of the crank 26. The bar 23 is then manipulated to turn the crank 26, and through the intervention of the link 27, screw 19, and gripping members 18, the rim end 32 will be drawn further over the rim end 31, thus contracting the rim. It will be apparent that the crank 26 may be brought to a position in which the pivotal connection 28 will be below the axis on which the crank turns, and as a consequence the rim ends 31 and 32 will be locked or be held until released again by the use of the bar 23. When the rim is in the contracted condition as shown in Fig. 4, the bar 23 may be removed, and a tire may be readily placed on the rim or be removed therefrom.

I claim:

A device for contracting a split tire rim comprising a block, pairs of clamps connected with the block and each clamp adapted to grip one of the abutting ends of the rim, one of said clamps being slidable relatively to said block, means adapted to be actuated in conjunction with the slidable clamp to flex the rim end gripped thereby inwardly to a position to permit further contraction of the rim, and means connected with said slidable clamp adapted to be actuated to slide said clamp to draw the rim end gripped thereby to an overlapped relation with respect to the other rim end.

Signed at 945 Bergenlin Ave. N. B., in the county of Hudson and State of New Jersey this 6th day of February, 1928 A. D.

SAMUEL H. SAVAGE.